(12) United States Patent
Noot

(10) Patent No.: US 7,217,120 B2
(45) Date of Patent: May 15, 2007

(54) HOT RUNNER NOZZLE

(75) Inventor: Dirk Vander Noot, Prospect Heights, IL (US)

(73) Assignee: V-Tek Molding Technologies Inc., Prospect Heights, IL (US)

( * ) Notice: Subject to any disclaimer, the term of this patent is extended or adjusted under 35 U.S.C. 154(b) by 318 days.

(21) Appl. No.: 10/869,659

(22) Filed: Jun. 16, 2004

(65) Prior Publication Data

US 2005/0281906 A1 Dec. 22, 2005

(51) Int. Cl.
B29C 45/20 (2006.01)

(52) U.S. Cl. .................................. 425/549; 264/328.15

(58) Field of Classification Search ................ 425/549; 264/328.15
See application file for complete search history.

(56) References Cited

U.S. PATENT DOCUMENTS

| | | | |
|---|---|---|---|
| 2,308,867 A | 1/1943 | Dinzl | |
| 3,669,596 A | 6/1972 | Savory | |
| 4,173,448 A | 11/1979 | Rees et al. | |
| 4,266,723 A | 5/1981 | Osuna-Diaz | |
| 4,268,241 A | 5/1981 | Rees et al. | |
| 4,273,525 A | 6/1981 | Reitan | |
| 5,208,052 A | 5/1993 | Schmidt et al. | |
| 5,316,468 A | 5/1994 | Gunther | |
| 5,554,395 A | 9/1996 | Hume et al. | |
| 5,759,595 A | 6/1998 | Gunther | |
| 5,879,727 A | 3/1999 | Puri | |
| 5,973,296 A | 10/1999 | Juliano et al. | |
| 6,022,210 A | 2/2000 | Gunther | |
| 6,422,857 B2 | 7/2002 | Wright et al. | |
| 6,428,305 B2 | 8/2002 | Jenko | |
| 6,506,045 B2 | 1/2003 | Corocher et al. | |
| 6,789,745 B1 | 9/2004 | Babin et al. | |
| 2003/0008034 A1 | 1/2003 | Niewels | |

FOREIGN PATENT DOCUMENTS

| | | |
|---|---|---|
| EP | 1 152 880 B1 | 5/2003 |
| WO | WO 01/28750 * | 4/2001 |

* cited by examiner

Primary Examiner—Tim Heitbrink
(74) Attorney, Agent, or Firm—Drinker Biddle & Reath LLP

(57) ABSTRACT

Hot runner nozzles and a method of assembling a hot runner nozzle. The invention provides a hot runner nozzle including a material tube having a tube cavity therethrough, a tip insertable into the tube cavity, and a cap threadably connected to the material tube, the cap engaging the housing and the tip to secure the tip to the material tube. Also, the invention provides a hot runner nozzle including a material tube having a tube cavity therethrough, the tube cavity defining a first portion having a first diameter and a second portion having a second diameter greater than the first diameter, a tip insertable into the tube cavity, wherein the tip engages the material tube in the first portion of the tube cavity and is spaced from the material tube in the second portion of the tube cavity to provide an air space between the tip and the material tube.

24 Claims, 3 Drawing Sheets

HOT RUNNER NOZZLE

FIELD OF THE INVENTION

The present invention generally relates to nozzles for injection molding and, more specifically, to hot runner nozzles for the injection of liquefied plastics into molds.

BACKGROUND OF THE INVENTION

Hot runner injection nozzles are commonly used to dispense liquefied plastic into molds. It is essential that hot runner injection nozzles maintain a flowable, liquefied plastic material throughout the length of the nozzle and into the mold in order to properly dispense the liquefied plastic into the mold. This is accomplished by maintaining the plastic material at a proper elevated temperature. Maintaining the plastic material at the proper elevated temperature has proven to be burdensome in the prior art because the plastic material is subject to cooling as it moves away from the plastic injection molding machine and the main heating source, and into the nozzle.

Typical hot runner nozzles include a material tube through which the plastic material flows from the plastic injection molding machine to the mold and a valve or tip integral with or connected to an end of the material tube from which the material is dispensed into the mold. Many currently available nozzles having this configuration do not properly dispense liquid plastic material because the material cools substantially (cold material commonly referred to as cold slug) and becomes less flowable as the plastic material moves away from the main heating source, through the material tube and out the valve or tip. Cooling of the liquefied plastic causes it to leave deposits within the material tube and the valve or tip. Such deposits can solidify and hamper material flowability through the tube and the valve or tip. Sometimes material flow through the tube and the valve or tip can be completely blocked, in which case the nozzle may need to be replaced or cleaned. Flow of material through the valve or tip can also be hampered or blocked by foreign materials such as, for example, metal shavings entering the material tube or by material that burns and hardens within the material tube.

Some hot runner nozzles utilize a secondary heater positioned in the nozzle to maintain a proper elevated temperature of the plastic material. Such secondary heaters have been placed in contact with the material tube, thereby heating the material tube and the plastic material therein. Secondary heaters commonly terminate short of the valve or tip because of structural limitations of the nozzle. Since the secondary heaters do not heat the plastic material within the valve or tip, the plastic material loses heat in that area. Heat loss most commonly occurs by conduction through the walls of the material tube, the valve and/or the tip.

In instances where build-ups occur in the nozzles or the nozzle becomes completely blocked, the molding process may need to be interrupted to clean or replace the nozzle. Nozzles are typically burdensome to disassemble and to clean. Oftentimes, the nozzle simply will be replaced to avoid such burdensome work and the associated downtime. Repeated unnecessary replacement of hot runner nozzles adds unnecessary expense to the overall molding process. In addition, continuous purchasing and replacing of hot runner nozzles can be costly.

SUMMARY OF THE INVENTION

In some aspects, the invention provides a hot runner nozzle for injecting heated flowable plastic material into a mold, the hot runner nozzle including a housing, a material tube at least partially positioned within the housing and having a tube cavity therethrough, the material being flowable through the tube cavity, a tip formed separately from the material tube and insertable into the tube cavity at a distal end of the material tube, the tip having a tip orifice therethrough in fluid communication with the tube cavity to facilitate material flow from the tube cavity through the tip orifice, and a cap threadably connected to the material tube, the cap being engageable with the housing and being engageable with the tip to secure the tip to the material tube.

Also, in some aspects, the invention provides a hot runner nozzle including a housing, a material tube at least partially positioned within the housing and having a tube cavity therethrough, heated plastic material being flowable through the tube cavity, and the tube cavity defining a first portion having a first diameter and a second portion having a second diameter greater than the first diameter, a tip formed separately from the material tube and insertable into the tube cavity at a distal end of the material tube, the tip having a tip orifice therethrough in fluid communication with the tube cavity to facilitate material flow from the tube cavity through the tip orifice, the tip engaging the material tube in the first portion of the tube cavity and being spaced from the material tube in the second portion of the tube cavity to provide an air space between the tip and the material tube in the second portion of the tube cavity, and a cap connected to the material tube, the cap being engageable with the housing and the tip to secure the tip to the material tube.

In addition, in some aspects, the invention provides a method of assembling a hot runner nozzle, the method including providing a housing, providing a material tube at least partially positioned within the housing, the material tube defining a tube cavity therethrough, heated plastic material being flowable through the tube cavity, inserting a tip into the tube cavity, the tip having a tip orifice therethrough in fluid communication with the tube cavity to facilitate material flow from the tube cavity through the tip orifice, threadably connecting a cap to the material tube, engaging the housing with the cap, and engaging the tip with the cap to secure the tip to the material tube.

Further, in some aspects, the invention provides a hot runner nozzle for injecting heated flowable plastic material into a mold, the hot runner nozzle including a housing, a material tube at least partially positioned within the housing and having a tube cavity therethrough and external threads on an exterior surface of the material tube, wherein material is flowable through the tube cavity, and wherein the tube cavity defines a first portion having a first diameter and a second portion having a second diameter greater than the first diameter, a tip formed separately from the material tube and insertable into the tube cavity at an end of the material tube, the tip having a tip orifice therethrough in fluid communication with the tube cavity to facilitate material flow from the tube cavity through the tip orifice, the tip engaging the material tube in the first portion of the tube cavity and being spaced from the material tube in the second portion of the tube cavity to provide an air space around the tip in the second portion of the tube cavity, and a cap having a cap cavity and internal threads on at least a portion of an interior surface of the cap, the cap being threadably connected to the material tube by engaging the internal threads of the cap with the external threads of the material tube and the cap being slideably engageable with the housing to allow movement of the cap relative to the housing when the material tube expands due to elevated temperatures, and the cap being engageable with the tip to secure the tip to the material tube.

Further objects and advantages of the present invention, together with the organization and manner of operation thereof, will become apparent from the following detailed description of the invention when taken in conjunction with the accompanying drawings, wherein like elements have like numerals throughout the drawings.

Figure 1:
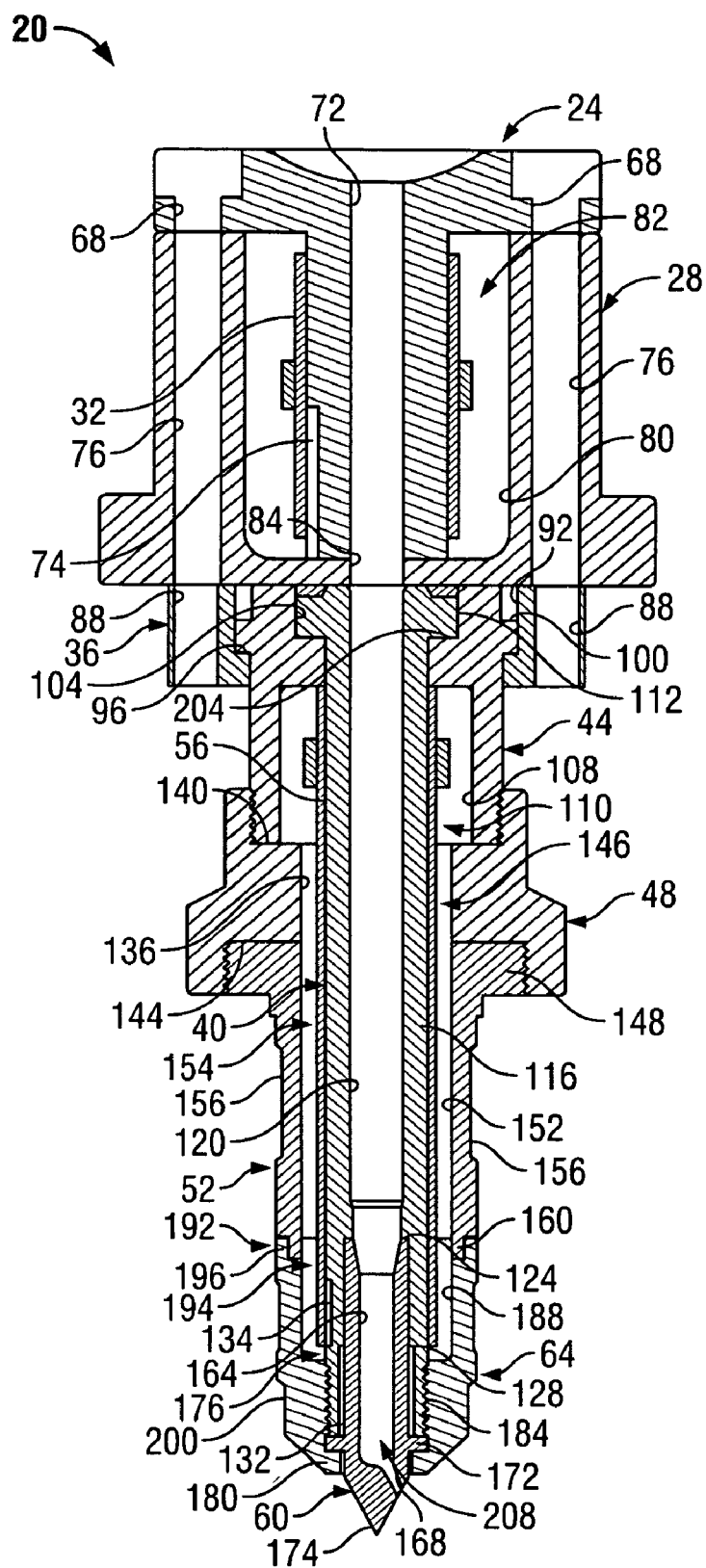
FIG. 1 is a cross-sectional view of a hot runner nozzle embodying aspects of the invention.

Before at least one embodiment of the invention is explain in detail, it is to be understood that the invention is not limited in its application to the details of the construction and arrangements of the components set forth in the following description or illustrated in the drawings. The invention includes other embodiments and can be practiced or carried out in various different ways. Also, it is understood that the phraseology and terminology used herein is for the purpose of description and should not be regarded as limiting. The use of "including," "comprising," or "having" and variations thereof is meant to encompass the items listed thereafter and equivalents thereof as well as additional items. Unless limited otherwise, the terms "connected," "coupled," and variations thereof herein are used broadly and encompass direct and indirect connections and couplings. In addition, the terms "connected" and "coupled" and variations thereof are not restricted to physical or mechanical connections or couplings.

DETAILED DESCRIPTION

Figure 2:
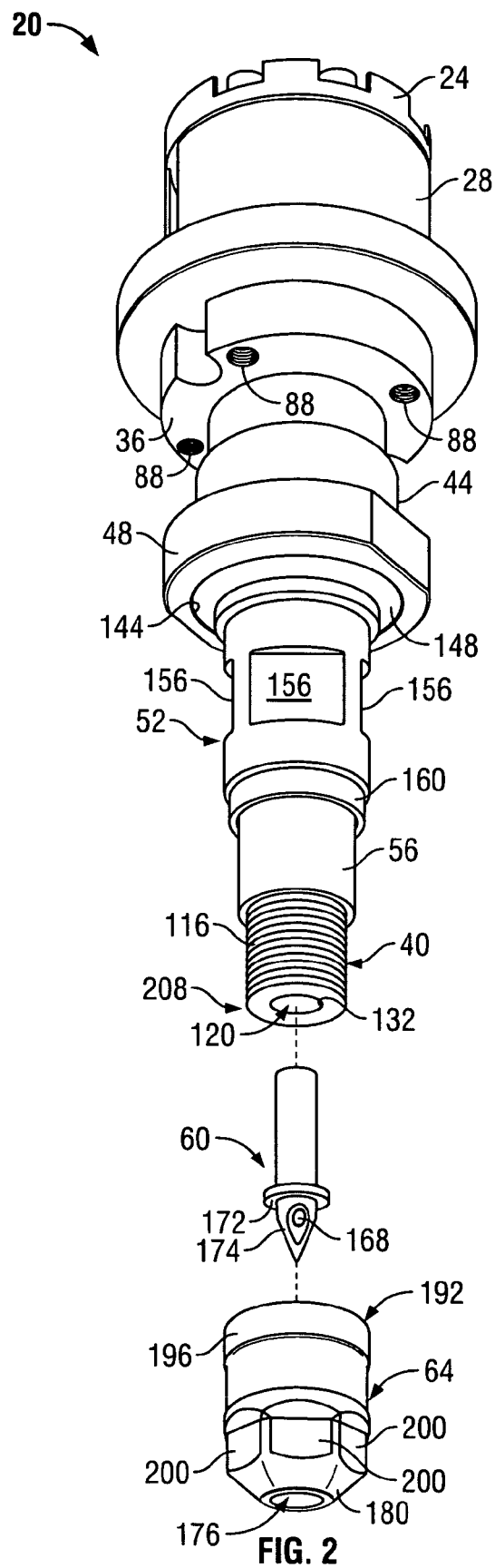
FIG. 2 is a partially exploded perspective view of the nozzle.

Referring to FIGS. 1 and 2, a hot runner nozzle 20 is illustrated and is operable to inject liquid material, such as plastic, from a plastic injection molding machine (not shown) to a mold (not shown) for forming molded components. The nozzle 20 includes a nozzle adapter 24, an adapter collar 28, a first heater 32, a connecting collar 36, a material tube 40, a material tube collar 44, a spacer 48, a sleeve 52, a second heater 56, an injection tip 60 and a cap 64. It should be understood that a housing of the nozzle 20 can be defined by any one of, any combination of, or all of the nozzle adapter 24, the adapter collar 28, the connecting collar 36, the material tube collar 44, the spacer 48, the sleeve 52, and the cap 64.

The adapter 24 includes a plurality of fastener apertures 68 for receiving fasteners (not shown) for assembling the nozzle 20 (discussed in greater detail below). A material cavity 72 is defined through the adapter 24 and material, such as liquid plastic, from the plastic injection molding machine flows through the material cavity 72 toward the tip 60 of the nozzle 20. The first heater 32 surrounds and substantially contacts an exterior surface of the adapter 24 to heat the adapter 24 and the material passing through the material cavity 72. In the illustrated construction, the first heater 32 is a Thick Film Technology Heater manufactured by Watlow Electric Manufacturing Company and disclosed in U.S. Pat. No. 5,973,296, the entire contents of which are incorporated herein by reference. However, the first heater 32 can be any type of heater adaptable for heating within a hot runner nozzle. A slot 74 is defined in the exterior surface of the adapter and receives a thermocouple (not shown) therein for taking accurate temperature readings of the material flowing through the material cavity 72. The thermocouple is positioned within the slot 74 to inhibit its temperature readings from being influenced by the main heating source of the plastic injection molding machine and the second heater 56.

Adapter collar 28 includes a plurality of fastener apertures 76 aligned with the fastener apertures 68 of the adapter 24 for receiving the fasteners for assembling the nozzle 20. A central cavity 80 is defined in the adapter collar 28 to provide a space for the first heater 32 and excess space 82 around the first heater 32 and the material tube 40. This excess space 82 acts as an insulator to inhibit heat loss by conduction from the first heater 32, the adapter 24 and the material. A material aperture 84 is defined through an end surface of the adapter collar 28 and is aligned with the material cavity 72 of the adapter 24.

With continued reference to FIGS. 1 and 2, the connecting collar 36 defines a plurality of fastener apertures 88 aligned with the fastener apertures 68, 76 of the adapter 24 and the adapter collar 28 for receiving the fasteners for assembling the nozzle 20. In some constructions, the aligned apertures 68, 76, 88 of the adapter 24, the adapter collar 28 and the connecting collar 36 can be internally threaded to receive a threaded fastener for connecting the adapter 24, the adapter collar 28 and the connecting collar 36. In other constructions, only the apertures 88 of the connecting collar 36 are internally threaded to receive complementary threaded ends of fasteners therein to connect the adapter 24, the adapter collar 28 and the connecting collar 36. In yet other constructions, the walls of the aligned apertures 68, 76, 88 are smooth to receive a fastener therethrough and a complementary threaded device, such as a nut, is threaded onto an end of the fastener. The connecting collar 36 also defines a collar cavity 92 for receiving a portion of the material tube collar 44 and a collar flange 96 for engaging the material tube collar 44 (discussed in greater detail below).

The material tube collar 44 includes a radial flange 100 extending therearound positioned in the collar cavity 92 and engaging the collar flange 96 of the connecting collar 36. An upper cavity 104 and a lower cavity 108 are defined in the material tube collar 44. The upper cavity 104 receives a portion of the material tube 40 when the nozzle 20 is assembled. The lower cavity 108 provides space for the second heater 56 and excess space 110 around the second heater 56 and the material tube 40. This excess space 110 acts as an insulator to inhibit heat loss by conduction from the second heater 56, the material tube 40 and the material.

With continued reference to FIGS. 1 and 2, the material tube 40 includes an enlarged head portion 112 positioned in the upper cavity 104 of the material tube collar 44 and a body portion 116 extending downwardly from the head portion 112. A material cavity 120 is defined through the material tube 40 and is aligned with the material cavity 72 of the adapter 24 and the material aperture 84 of the adapter collar 28. Material flows from the material cavity 72 of the adapter 24 and the material aperture 84 into the material cavity 120 of the material tube 40. The material cavity 120 of the material tube 40 defines a first stepped portion 124 for receiving the tip 60 and a second stepped portion 128 having a larger diameter than the first stepped portion 124 to provide an air space 132 between the material tube 40 and the tip 60 (discussed in greater detail below). The material tube 40 also defines a slot 134 in an exterior surface thereof. A thermocouple (not shown) is located within the slot 134 to take accurate temperature readings of the material flowing through the material cavity 120. The thermocouple is properly positioned within the slot 134 to inhibit its temperature readings from being influenced by the main heating source of the plastic injection molding machine and the first heater 32.

The spacer 48 defines a spacer cavity 136 for receiving the body 116 of the material tube 40. The spacer cavity 136 includes an upper portion 140 having internal threads for threadably engaging external threads of the material tube collar 44 and a lower portion 144 having internal threads for threadably engaging external threads of the sleeve 52. The spacer 48 threadably connects the sleeve 52 to the material tube collar 44. The spacer cavity 136 is sized to provide space for the second heater 56 and to provide excess space 146 around the second heater 56 and the material tube 40. Spacer cavity 136 acts as an insulator to inhibit heat loss by conduction from the second heater 56, the material tube 40 and the material.

Figure 3:
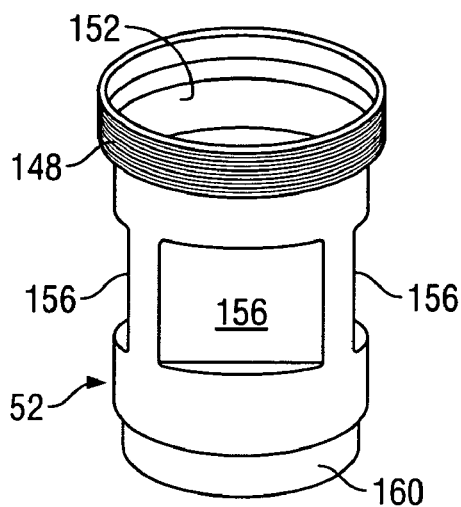
FIG. 3 is a perspective view of a sleeve of the nozzle.

With reference to FIGS. 1–3, the sleeve 52 includes an enlarged head portion 148 having external threads thereon for threadably engaging the spacer 48 within the lower portion 144 of the spacer 48. A sleeve cavity 152 is defined through the sleeve 52 for receiving the material tube 40 and the second heater 56. The sleeve cavity 152 is sized sufficiently to provide excess space 154 around the second heater 56 and the material tube 40. The excess space 54 acts as an insulator to inhibit heat loss by conduction from the second heater 56, the material tube 40 and the material. A plurality of flats 156 are defined in an exterior surface of the sleeve 52 and are engageable by a tool for assembly and disassembly of the nozzle 20. In the illustrated construction, the sleeve 52 includes four flats 156 spaced at ninety-degree increments around the sleeve 52. However, the sleeve 52 can include any number of flats 156 spaced at any increment around the sleeve 52 and still be within the spirit and scope of the present invention. A reduced portion 160 is defined near the bottom of the sleeve 52 for receiving the cap 64 and facilitating expandability of the nozzle 20 (discussed in greater detail below).

Figure 5:
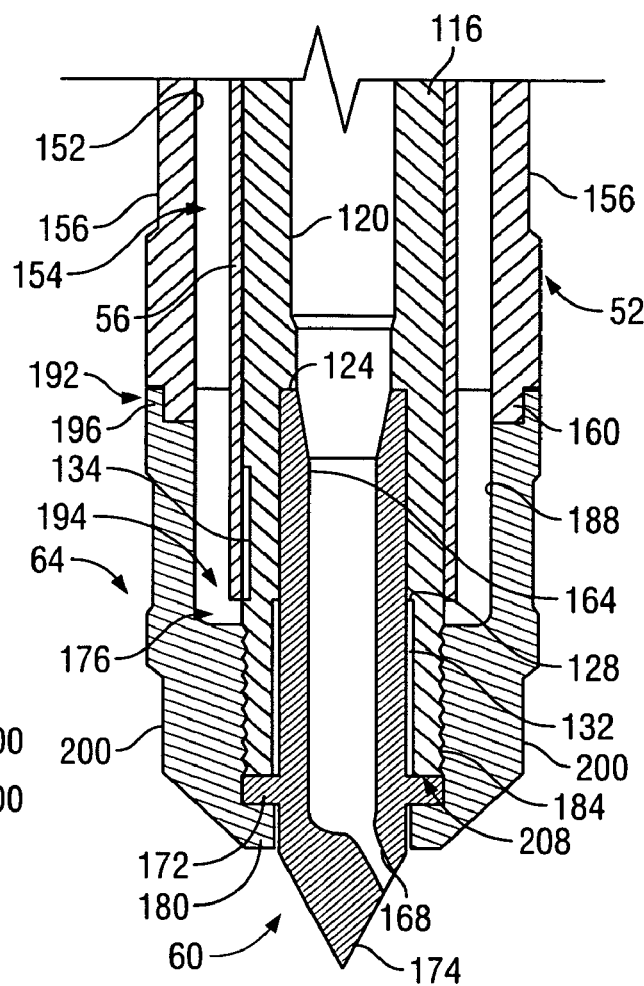
FIG. 5 is an enlarged cross-sectional view of a portion of the nozzle.

With reference to FIGS. 1, 2 and 5, the tip 60 defines a central tip orifice 164 therethrough aligned with the central material cavities 72, 120 of the adapter 24 and the material tube 40 to allow material to flow through the nozzle 20 and out of the tip 60. The tip 60 is made of a material having high thermal conductivity properties to allow heat from the second heater 56 to efficiently reach the material within the material tube 40. In the illustrated construction, the tip 60 is made of a highly thermo-conductive tungsten carbide alloy, which is currently preferred. However, the tip 60 can be made of other materials, such as copper beryllium, having high conductivity properties and still be within the spirit and scope of the present invention. The tip 60 also defines at least one injection aperture 168 extending from the central tip orifice 164 and through the exterior surface of the tip 60 to facilitate injection of the material from the tip 60. It should be understood that the tip 60 can define any number of injection apertures 168 in any orientation within the nozzle 20 and still be within the spirit and scope of the present invention. It should also be understood that tips can have a variety of shapes and configurations for various material injection applications and that any appropriate tip can be utilized with the nozzle 20. For example, tips having an open tip design for injecting thermoplastic amorphous materials can be used.

The tip 60 includes a flange 172 disposed therearound and is engageable with the cap 64 to secure the tip 60 to the nozzle 20. In the illustrated construction, the flange 172 is integral with the tip 60 and is made of titanium. However, the flange 172 can be formed separately from the tip 60 and connected to the tip 60 by a variety of methods such as, for example, welding, brazing, soldering, or other types of bonding. Also, the flange can be made of other materials having low conductive properties and still be within the spirit and scope of the present invention. In some constructions, the flange 172 is made of the same material as the tip 60. An end portion 174 of the tip 60 beyond the flange 172 has a roughened texture or finish on its exterior surface. In the illustrated construction, the end portion has a "D2" finish, which emulates sandblasted metal or unpolished metal. The roughened finish reduces the remnants or vestige left behind when the gate breaks off. It is believed that the roughened finish may agitate the molecules of the material to inhibit the molecules from adhering to one another. To the contrary, it is believed that a polished finish on a tip creates a boundary layer of plastic which will cause the molecules of the material to adhere to each other. The result of a polished finish is a higher vestige or even strings.

With continued reference to FIGS. 1, 2 and 5, the cap 64 is made of a material having low conductive properties to inhibit material heat loss through the cap 64. In the illustrated construction, the cap 64 is made of titanium. However, the cap 64 can be made of other materials having low conductive properties and still be within the spirit and scope of the present invention. The cap 64 defines a cap cavity 176 therethrough having a tip portion 180, a connecting portion 184, a heater portion 188 and a sleeve engaging portion 192. The tip portion 180 is complementarily sized with the size of the tip 60 to provide a close fit relation between the cap 64 and the tip 60. In the illustrated construction, spacing between the cap 64 and the tip 60 is about 0.30 millimeters to 0.50 millimeters. However, the spacing between the cap 64 and the tip 60 can vary and still be within the spirit and scope of the present invention. Internal threads are defined in the connecting portion 184 and engage complementary external threads of the material tube 40 to threadably connect the cap 64 to the material tube 40. The heater portion 188 is appropriately sized to provide space for the second heater 56 and to provide excess space 194 around the second heater 56 and the material tube 40. The excess space 194 acts as an insulator to inhibit heat loss by conduction from the second heater 56, the material tube 40 and the material. The sleeve engaging portion 192 defines an overlapping portion 196 complementary to the reduced portion 160 of the sleeve 52 for sealing engagement therewith. The engagement between the sleeve 52 and the cap 64 facilitates expandability of the nozzle 20 (discussed in greater detail below). A plurality of flats 200 are defined around an outer surface of the cap 64 and are engageable by a tool, such as a wrench, for assembly and disassembly of the nozzle 20.

Now that the components of the nozzle 20 have been described, assembly and disassembly of the nozzle 20 will be described in detail. Ease of assembly and disassembly of the nozzle 20 will be apparent in view of the following discussion and with reference to the drawings.

With reference to FIGS. 1 and 2, assembly of the nozzle 20 begins by sliding the first heater 32 around the exterior surface of the adapter 24. In the illustrated construction, the adapter 24 and the first heater 32 are appropriately sized to slip fit the heater 32 onto the adapter 24 and inhibit the first heater 32 from sliding off of the adapter 24 without external forces, such as forces applied by tools or an operator. Also in the illustrated construction, the first heater 32 is secured to the adapter 24 without the use of additional means. In some constructions, the nozzle 20 includes additional securing means for securing the first heater 32 to the adapter 24. Such securing means can include adhesive, a retaining ring, welding, brazing, soldering, and the like.

After securing the first heater 32 to the adapter 24, the adapter 24 and the first heater 32 are inserted into the central cavity 80 of the adapter collar 28 and the fastener apertures 68, 76 of the adapter 24 and the adapter collar 28 are aligned. The material tube 40 is inserted through the upper and lower cavities 104, 108 of the material tube collar 44 until the enlarged head 112 of the material tube 40 engages an internal flange 204 of the material tube collar 44. The material tube 40 and the material tube collar 44 are then inserted through the collar cavity 92 of the connecting collar 36 until the radial flange 100 of the material tube collar 44 engages the collar flange 96 of the connecting collar 36. The connecting collar 36 along with the material tube 40 and the material tube collar 44 are brought into engagement with the adapter collar 28 and the fastener apertures 88 of the connecting collar 36 are aligned with the fastener apertures 68, 76 of the adapter 24 and the adapter collar 28. Fasteners are inserted into the aligned fastener apertures 68, 76, 88 to connect the adapter 24, the adapter collar 28, the connecting collar 36, the material tube 40 and the material tube collar 44.

With continued reference to FIGS. 1 and 2, the second heater 56 is slid around the body portion 116 of the material tube 40. The second heater 56 is connected to the material tube 40 in the same manner as the first heater 32 is connected to the adapter 24 and can be connected to the material tube 40 in all of the same alternative manners as the first heater 32 can be connected to the adapter 24. The second heater 56 is positioned above and out of interference with the external threading of the material tube 40. The spacer 48 is slid over the material tube 40 and threaded onto the material tube collar 44. Next, the sleeve 52 is slid over the material tube 40 and threaded to the spacer 48.

The tip 60 is then inserted into the material cavity 120 at a distal end 208 of the material tube 40 until the flange 172 engages the end of the material tube 40 and/or the tip 60 engages the first stepped portion 124 of the material tube 40. The cap 64 is then slid over the tip 60 and threaded onto the end of the material tube 40 by engaging internal threads of the cap 64 with external threads of material tube 40. The cap 64 is threaded onto the material tube 40 until the cap 64 sealingly engages the flange 172. Upon engagement between the cap 64 and the flange 172, the overlapping portion 196 of the cap 64 overlaps the reduced portion 160 of the sleeve 52. In the illustrated construction, the overlapping portion 196 and the reduced portion 160 engage each other, but permit sliding of the cap 64 relative to the sleeve 52 upon thermal expansion of the nozzle 20 (discussed in greater detail below). In some constructions, the overlapping portion 196 and the reduced portion 160 do not engage each other.

The components of the nozzle 20 are configured to facilitate many manners of assembly. Accordingly, the manner of assembling the nozzle 20 discussed above is only one of a variety of manners of assembling and such manners of assembly should be apparent in view of the discussion and the drawings. For example, the tip 60 can be positioned within the cap 64 and the tip 60 can be inserted into the material tube 40 simultaneously with the cap 64 being threaded to the material tube 40. Also, the connecting collar 36, the material tube collar 44, the material tube 40, the second heater 56, the spacer 48, the sleeve 52, the tip 60 and the cap 64 can all be assembled, then all of these components can be connected to the adapter collar 28 with the fasteners.

The nozzle 20 can be disassembled in reverse order to the manner of assembly discussed above or, the nozzle 20 can be disassembled in a variety of other manners facilitated by the components of the nozzle 20, but not discussed herein. Such manners of disassembly should be apparent in view of the discussion and the drawings.

As is apparent from the discussion and the drawings, the nozzle 20 can be easily assembled and disassembled by threading and unthreading several of the components from one another. Such threading enables the nozzle 20 to be easily maintained and cleaned, therefore making the replacement of components or replacement of the entire nozzle 20 less likely then in prior art designs. However, if a component needs to be replaced, the ease of which the nozzle 20 is assembled and disassembled and the modularity of the nozzle 20 allow an operator to quickly and easily replace only the component that requires replacing.

Figure 4:
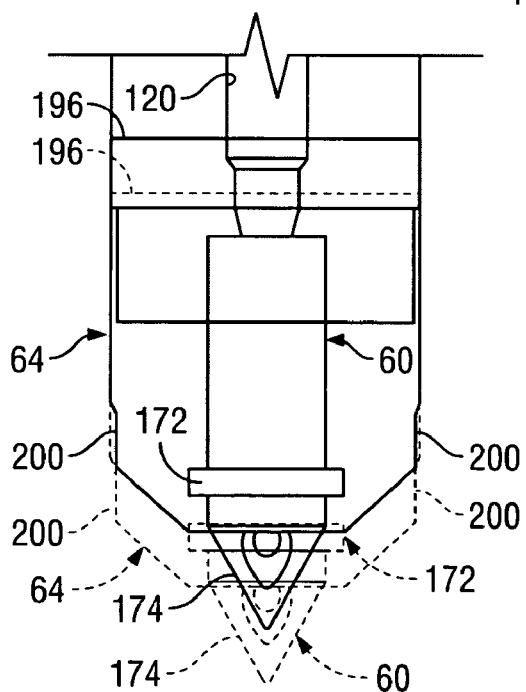
FIG. 4 is a schematical view of a portion of the nozzle, shown in a non-expanded position in solid lines and shown in an expanded position in dashed lines.

With reference to FIGS. 1, 4 and 5, the nozzle 20 is configured to facilitate the expandability of the nozzle 20 that occurs due to the elevated temperatures of the components and the material. Particularly, the heated material in combination with the first and second heaters 32, 56 cause the material tube 40 to expand in the longitudinal direction of the nozzle 20. Due to the engagement between the tip 60 and the material tube 40 and the threaded connection between the cap 64 and the material tube 40, expansion of the material tube 40 causes the tip 60 and the cap 64 to move in the longitudinal direction. As the cap 64 moves, the overlapping portion 196 of the cap 64 moves relative to the reduced portion 160 of the sleeve 52. The engagement between the overlapping portion 196 and the reduced portion 160 is maintained during expansion of the material tube 40 to maintain an effective seal between the cap 64 and the sleeve 52.

It should be understood that the cap 64 and the sleeve 52 can be configured for engagement in a variety of manners other than the described and illustrated construction and still facilitate expansion of the nozzle 20 under elevated temperatures. Accordingly, any manner of engagement between the cap 64 and the sleeve 52 that facilitates expansion of the nozzle 20 is within the spirit and scope of the present invention.

With reference to FIGS. 1 and 5, the nozzle 20 is configured to inhibit material heat loss through conduction. The spaces 82, 110, 146, 154, 194 provided around the heaters 32, 56 and the material tube 40 act as insulators to inhibit heat loss from the heaters 32, 56, the material tube 40 and the material by conduction. The second stepped portion 128 of the material tube 40 also provides the air space 132 between the tip 60 and the material tube 40 to inhibit heat loss from the tip 60 to other portions of the nozzle 20 by conduction. The air space 132 provided by the second stepped portion 128 of the material tube 40 begins substantially near the lower end of the second heater 56. This position of the air space 132 is strategically located to inhibit heat loss through conduction at locations where the material is not heated. The material is prone to cooling when heat is not being provided to the material tube 40 and to the material. In addition, cooling occurs much quicker through conduction than through convection. Accordingly, the strategically positioned air space 132 inhibits heat loss of the material at locations where the material is not being heated by substantially eliminating conduction at those locations.

With continued reference to FIGS. 1 and 5, the nozzle 20 is also configured to have high, efficient heat transfer to the material within the nozzle 20. A substantial amount of the material cavity 72, 140 defined by the adapter 24 and the material tube 40 is surrounded by and in contact with either the first heater 32 or the second heater 56, therefore providing heat to the material through a substantial length of the nozzle 20. The adapter 24 and the material tube 40 are also made of a material having high heat conductivity. In the illustrated construction, the adapter 24 and the material tube 40 are made of 420 stainless steel heat treated to RC 48–50. However, the adapter 24 and the material tube 40 can be made of other materials having high heat conductivity and still be within the spirit and scope of the present invention. In addition, the tip 60 is made of material having high conductivity properties. Due to the high conductivity of the material tube 40 and the tip 60, heat is efficiently transferable from the second heater 56 to the material tube 40, to the tip 60 and to the material. All of these features and more provide a nozzle 20 having high, efficient heat transfer to the material within the nozzle 20.

Now that the components and assembly of the nozzle 20 have been described, operation of the nozzle 20 will be described herein. Molds, gates and components thereof are well known to those having ordinary skill in the art and, therefore, are not shown in the figures. However, at least one example of molds and gates will be discussed herein as they relate to the nozzle 20. The mold and gate described below with relation to the nozzle 20 are only one example of components with which the nozzle 20 can be utilized. Accordingly, the operation described below with respect to the mold and gate is not meant to be limiting and the nozzle 20 can be utilized with many types of molds and gates.

The nozzle 20 is inserted into a mold and resides in a gate bushing of a cavity plate. The material flows from the nozzle 20, through the gate bushing and into a part cavity defined in the mold. The gate bushing defines a bore that engages the nozzle 20 at positions "A" and "B" when the nozzle 20 is positioned within the bore. An air gap is provided around the nozzle 20 between positions A and B to insulate the nozzle 20 and inhibit the nozzle 20 from loosing heat by conduction. In one example, the bore includes a counterbore at position A and the bore radiuses down from position B to an eighty degree conical gate where the tip 60 resides. In the same example, a gap is provided from position B down to the gate and is fillable with the material being injected by the nozzle 20. Material is introduced into the gap on the first injection and solidifies in the gap to become a thermal insulator around a portion of the nozzle 20. In instances where the material is thermo-conductive, such as metal filled material, a high temperature PEEK (Victrex) or Vespel (manufactured by DuPont) insulator cap is used in place of the solidified material in the gap. In other examples, the conical gate can be other values than eighty degrees. In further examples, the gate can be a straight cylinder. In yet other examples, the conical gate can be a reversed cone.

The constructions and embodiments described above and illustrated in the drawings are presented by way of example only and are not intended as a limitation upon the concepts and principles of the present invention. As such, it will be appreciated by one having ordinary skill in the art that various changes in the elements and their configuration and arrangement are possible without departing from the spirit and scope of the present invention.

What is claimed is:

1. A hot runner nozzle for injecting heated flowable plastic material into a mold, the hot runner nozzle comprising:
   a housing;
   a material tube that includes external threads on an exterior surface, the material tube being at least partially positioned within the housing and having a tube cavity therethrough, wherein the material is flowable through the tube cavity;
   a tip formed separately from the material tube and insertable into the tube cavity at a distal end of the material tube, the tip having a tip orifice therethrough in fluid communication with the tube cavity to facilitate material flow from the tube cavity through the tip orifice; and
   a cap threadably connected to the material tube, the cap defining a cap cavity and internal threads on an interior surface, the internal threads and the external threads being engageable with each other to threadably connect the cap to the material tube and secure the tip to the material tube.

2. The nozzle of claim 1, wherein the cap is engageable with the housing at a position externally of the material tube.

3. The nozzle of claim 2, wherein the cap engages the housing substantially completely around the material tube.

4. The nozzle of claim 1, wherein the cap is slideably engageable with the housing to allow movement of the cap relative to the housing when the material tube thermally expands.

5. The nozzle of claim 4, wherein the cap continuously engages the housing during thermal expansion of the material tube to provide an effective seal between the cap and the housing.

6. The nozzle of claim 1, wherein the tip further comprises a flange extending circumferentially around the tip and projecting outwardly from the tip, the flange being trapped between the cap and the material tube when the cap is threaded to the material tube to secure the tip to the material tube.

7. The nozzle of claim 1, wherein the housing includes a sleeve defining a sleeve cavity therethrough and a reduced portion at an end of the sleeve, the material tube being at least partially positioned in the sleeve cavity, and wherein the cap defines a cap cavity therethrough and an overlapping portion at an end of the cap, the material tube being at least partially positioned in the cap cavity and the overlapping portion at least partially overlapping and being engageable with the reduced portion when the cap is threadably connected to the material tube.

8. The nozzle of claim 7, wherein the overlapping portion and the reduced portion are slideably engageable with each other to allow movement of the cap relative to the housing when the material tube thermally expands, and wherein the overlapping portion and the reduced portion are continuously engaged during thermal expansion of the material tube.

9. The nozzle of claim 1, wherein the tip includes a roughened finish on a portion thereof.

10. The nozzle of claim 1, wherein the tip includes a roughened finish on an end portion thereof insertable into a mold and engageable with the material, the roughened finish reducing the vestige of material.

11. A hot runner nozzle comprising:
    a housing;
    a material tube at least partially positioned within the housing and having a tube cavity therethrough, wherein heated plastic material is flowable through the tube cavity, and wherein the tube cavity defines a first portion having a first diameter and a second portion having a second diameter greater than the first diameter;
a tip formed separately from the material tube and insertable into the tube cavity at a distal end of the material tube, the tip having a tip orifice therethrough in fluid communication with the tube cavity to facilitate material flow from the tube cavity through the tip orifice, wherein the tip engages the material tube in the first portion of the tube cavity and is spaced from the material tube in the second portion of the tube cavity to provide an air space between the tip and the material tube in the second portion of the tube cavity; and
a cap connected to the material tube, the cap being engageable with the housing and the tip to secure the tip to the material tube.

12. The nozzle of claim 11, further comprising a heater contacting and providing heat to a portion of an exterior surface of the material tube, the second portion of the tube cavity initiating at a location substantially where the heater terminates contact with the exterior surface of the material tube.

13. The nozzle of claim 12, wherein the second portion extends away from the heater and toward an end of the material tube.

14. The nozzle of claim 11, wherein the air space is provided circumferentially around the tip.

15. The nozzle of claim 11, wherein the first portion and the second portion are adjacent each other, the first portion being spaced from an end of the material tube and the second portion extending from the first portion to the end of the material tube.

16. The nozzle of claim 15, further comprising a heater contacting and providing heat to a portion of an exterior surface of the material tube, the first portion being substantially positioned in the material tube at a location where the heater contacts the material tube and the second portion substantially initiating at a location where the heater terminates contact with the exterior surface of the material tube.

17. The nozzle of claim 11, wherein the nozzle includes a roughened finish on a portion of the nozzle.

18. A method of assembling a hot runner nozzle, the method comprising:
providing a housing;
providing a material tube at least partially positioned within the housing, the material tube defining a tube cavity therethrough, wherein heated plastic material is flowable through the tube cavity;
inserting a tip into the tube cavity, the tip having a tip orifice therethrough in fluid communication with the tube cavity to facilitate material flow from the tube cavity through the tip orifice; threadably connecting a cap to the material tube;
engaging the housing with the cap; and
engaging the tip with the cap to secure the tip to the material tube.

19. The method of claim 18, wherein the cap includes an overlapping portion at an end of the cap, and wherein the step of providing a housing includes providing a sleeve having a reduced portion near an end of the sleeve, and wherein the step of engaging the housing includes engaging the reduced portion with the overlapping portion when the cap is threadably connected to the material tube and continuously engaging the reduced portion with the overlapping portion during thermal expansion of the material tube.

20. The method of claim 18, wherein the step of providing a housing includes providing a first housing portion, a second housing portion, a third housing portion and a fourth housing portion, the method further comprising engaging the material tube with the second housing portion and securing the material tube to the first housing portion by connecting the first and second housing portions, and the method further comprising connecting the third housing portion to the second housing portion and connecting the fourth housing portion to the third housing portion, and wherein the step of engaging the housing with the cap includes engaging the cap with the fourth housing portion.

21. The method of claim 18, wherein the step of connecting the third housing portion to the second housing portion includes threadably connecting the third housing portion to the second housing portion, and wherein the step of connecting the fourth housing portion to the third housing portion includes threadably connecting the fourth housing portion to the third housing portion.

22. The method of claim 18, wherein the step of providing a material tube includes providing a material tube completely positioned within the second, third and fourth housing positions and the cap.

23. A hot runner nozzle for injecting heated flowable plastic material into a mold, the hot runner nozzle comprising:
a housing;
a material tube at least partially positioned within the housing and having a tube cavity therethrough and external threads on an exterior surface of the material tube, wherein material is flowable through the tube cavity, and wherein the tube cavity defines a first portion having a first diameter and a second portion having a second diameter greater than the first diameter
a tip formed separately from the material tube and insertable into the tube cavity at an end of the material tube, the tip having a tip orifice therethrough in fluid communication with the tube cavity to facilitate material flow from the tube cavity through the tip orifice, wherein the tip engages the material tube in the first portion of the tube cavity and is spaced from the material tube in the second portion of the tube cavity to provide an air space around the tip in the second portion of the tube cavity; and
a cap having a cap cavity and internal threads on at least a portion of an interior surface of the cap, wherein the cap is threadably connected to the material tube by engaging the internal threads of the cap with the external threads of the material tube and the cap is slideably engageable with the housing to allow movement of the cap relative to the housing when the material tube expands due to elevated temperatures, and wherein the cap is engageable with the tip to secure the tip to the material tube.

24. The nozzle of claim 23, wherein the tip has a roughened finish on an end portion thereof.

* * * * *